UNITED STATES PATENT OFFICE.

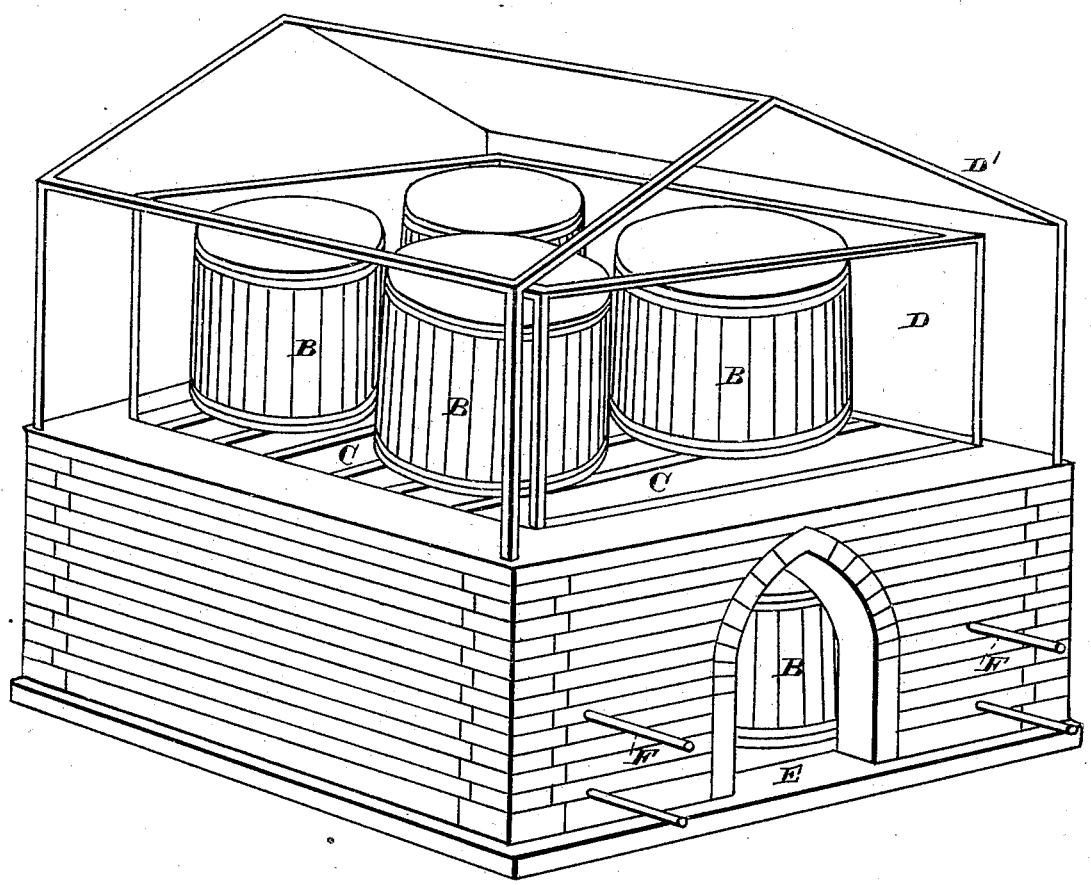

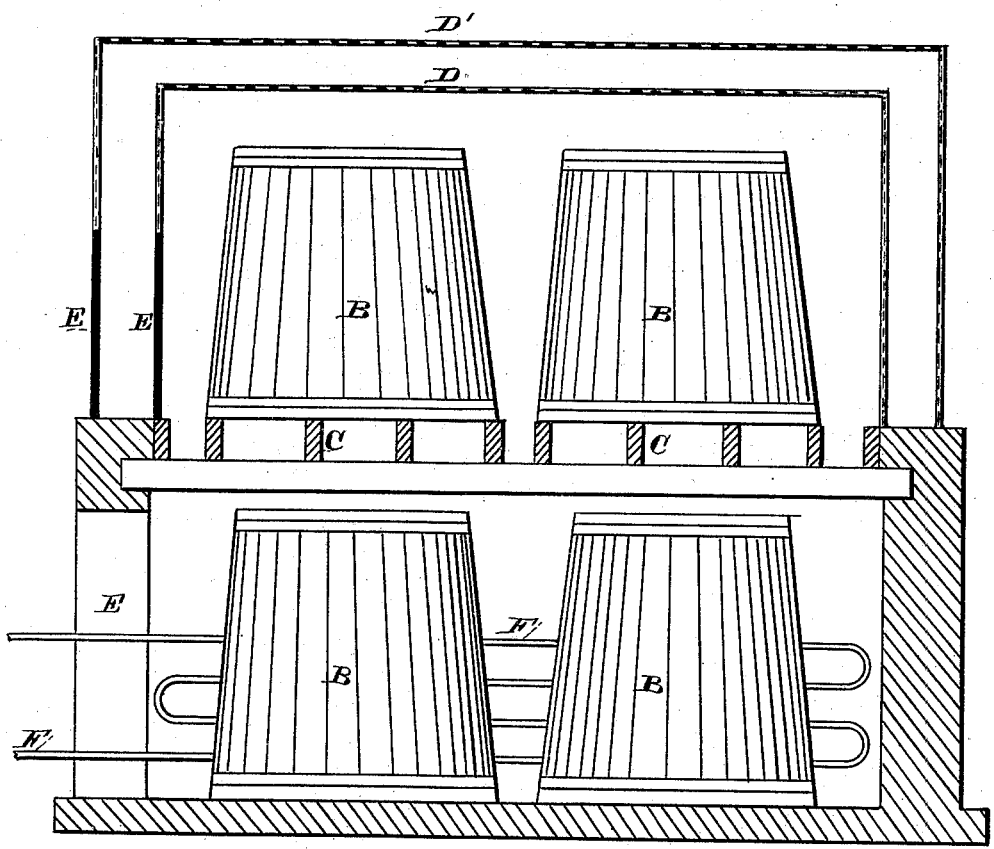

MANUEL T. DE ABREU, OF ST. HELENA, CALIFORNIA.

APPARATUS FOR MATURING SHERRY-WINE.

SPECIFICATION forming part of Letters Patent No. 277,554, dated May 15, 1883.

Application filed October 21, 1882. (No model.)

*To all whom it may concern:*

Be it known that I, MANUEL T. DE ABREU, of St. Helena, county of Napa, State of California, have invented an Improved Sherry-Wine Apparatus; and I hereby declare the following to be a full, clear, and exact description thereof.

My invention relates to an apparatus for maturing sherry-wine; and it consists in a novel construction and combination of parts, all as hereinafter fully described, and set forth in the claim hereto annexed.

Referring to the accompanying drawings for a more complete explanation of my invention, Figure 1 is an exterior view of my apparatus. Fig. 2 is a vertical longitudinal section.

In the maturing of sherry-wine it is customary to expose the casks or tanks containing it to long-continued heat, and for this purpose they are usually placed in buildings or chambers which may be closed tight. Within these buildings the tanks or casks are subjected to the action of hot air from furnaces or heaters until the desired change is effected. Great care must be exercised not to let the heat become too great, and also to prevent fires, and in any event the casks become dry and must be recoopered, and a considerable percentage of the wine is lost by evaporation.

In my invention, A is a house or chamber of sufficient size to receive as many tanks or casks as may be desired. In some cases it may be desirable to introduce and remove the casks as their contents are to be treated; but in the present case I have shown tanks B, which may be filled and emptied by suitable connecting-pipes from the outside. I have shown this chamber as built of brick, stone, or other suitable material, and open at the top. Beams C extend across the top to support a second tier of tanks, B, while the spaces between them allow a sufficient circulation of the air of the building around and beneath the tanks. Around the upper tier of tanks is built a glazed inclosure, D, and exterior to it, at such a distance as to leave a considerable air-space, is a second glazed structure, D', inclosing the first. Two or more of these concentric glazed inclosures may be made, having air-spaces between each, as shown, and both these and the building A below may have suitable entrances and doors E, as shown. Within the lower portion, A, pipes F are arranged around the walls and extending outside, so as to have connecting-pipes coupled with them for the purpose of introducing steam or hot air to assist the process when necessary; but I depend principally upon the heat of the sun, which is concentrated upon the glazed building, and by means of the double walls is intensified and retained, so to provide in most cases all the heat necessary for the work. At night or in cloudy or damp weather this action may be assisted by means of the heating-pipes before mentioned. The double-walled glazed building receives freely the heat-rays of the sun, which produce a high temperature within the inner building, and it is kept constant and prevented from being lowered by the exterior wall or walls of air, as shown. The heat produced in the upper glazed building circulates freely through the lower inclosure as well, and by this apparatus I am enabled to mature sherry-wine with but little artificial heat and less loss from evaporation.

Having thus described my invention, what I desire to secure by Letters Patent is—

The structure A and the superposed double-glazed structure D D', opening into each other, with their casks or tanks B for the reception of wine, in combination with the heating-pipes F, substantially as and for the purpose herein described.

In witness whereof I hereunto set my hand.

MANUEL T. DE ABREU.

Witnesses:
CHARLES E. SWEZY,
J. C. SYFERT.